United States Patent [19]
Akagiri

[11] Patent Number: 5,388,209
[45] Date of Patent: Feb. 7, 1995

[54] APPARATUS FOR HIGH-SPEED RECORDING COMPRESSED DIGITAL DATA WITH INCREASED COMPRESSION

[75] Inventor: Kenzo Akagiri, Kanagawa, Japan

[73] Assignee: Sony Corporation, Japan

[21] Appl. No.: 924,550

[22] Filed: Jul. 31, 1992

[30] Foreign Application Priority Data

Aug. 2, 1991 [JP] Japan .................... 3-216483
Aug. 2, 1991 [JP] Japan .................... 3-216484

[51] Int. Cl.6 .............................................. G10L 9/00
[52] U.S. Cl. .................... 395/2.38; 3.95/2.36; 3.95/2.1; 3.95/2.39
[58] Field of Search .................... 395/2, 2.1–2.39; 381/29–51

[56] References Cited

U.S. PATENT DOCUMENTS

| 4,903,301 | 2/1990 | Kondo et al. | 381/30 |
| 4,972,484 | 11/1990 | Thiele et al. | 381/37 |
| 5,040,217 | 8/1991 | Brandenburg et al. | 381/47 |
| 5,105,463 | 4/1992 | Veldhuis et al. | 381/30 |
| 5,142,656 | 8/1992 | Fielder et al. | 381/37 |
| 5,148,330 | 9/1992 | Duurland et al. | 360/40 |
| 5,150,387 | 9/1992 | Yoshikawa et al. | 381/31 X |

FOREIGN PATENT DOCUMENTS

| 0145788A1 | 6/1985 | European Pat. Off. | H04B 12/02 |
| 0409248A2 | 1/1991 | European Pat. Off. | H03M 7/30 |
| 0420745A2 | 4/1991 | European Pat. Off. | H04B 1/66 |

OTHER PUBLICATIONS

Brandenburg et al., "Aspec: Adaptive Spectral Entropy Coding of High Quality Music Signals," Audio Engineering Society Preprint No. 3011 (1991 Feb.).
Davidson et al., "Low Complexity Transform Coder for Satellite Link Applications" Audio Engineering Society Preprint No. 2966 (1990 Sep.).
Esteban et al., "Application of Quadrature Mirror Filters To Split Band Voice Coding Schemes," Record of the 1977 ICASSP, pp. 191–195 (1977 May).
Johnston, "Transform Coding of Audio Signals Using Perceptual Noise Criteria," 6 IEEE Trans. on Selected Areas in Communications, 314–323 (1988 Feb.).
Rothweiler, "Polyphase Quadrature Filters-A New Subband Coding Technique," 3 Proc. 1983 ICASSP 1280–1283 (1983 Apr.).
Schroeder et al., "High Quality Digital Audio Encoding with 3.0 Bits/Sample Using Adaptive Transform Coding," Audio Engineering Society Reprint No. 2321 (1986 Mar.).
Stoll et al., "Masking-Pattern Adapted Sub-Band Coding: Use of the Dynamic Bit-Rate Margin," Audio Engineering Society Preprint No. 2585 (1988 Mar.).
Thiele et al., "Low Bit-Rate Coding of High-Quality Audio Signals—An Introduction to MASCAM System," 230 EBU Technical Review 71–93 (1988 Aug.).

Primary Examiner—Allen R. MacDonald
Assistant Examiner—Michelle Doerrler
Attorney, Agent, or Firm—Limbach & Limbach

[57] ABSTRACT

An apparatus for high-speed recording compressed digital data with additional bit reduction. The apparatus makes a recording, on a recording medium, of a recording signal in response to compressed digital data representing an audio information signal. The recording, upon reproduction from the recording medium, conversion to an analog signal, and reproduction of the analog signal, is for perception by the human ear. The compressed digital data has a constant bit rate. The apparatus includes a device that receives the compressed digital data, and a device that derives the recording signal by removing redundant bits from the compressed digital data. Redundant bits are bits that make no difference to quantization noise perceived by the human ear. Finally, the apparatus includes a device for recording the recording signal on the recording medium. The recording signal having a variable bit rate. In a second embodiment, the apparatus also includes a device that reproduces the compressed digital data from a another recording medium, enabling compressed digital data to be high-speed copied from the other recording medium.

42 Claims, 10 Drawing Sheets

APPARATUS FOR HIGH-SPEED RECORDING COMPRESSED DIGITAL DATA WITH INCREASED COMPRESSION

FIELD OF THE INVENTION

This invention relates to an apparatus for recording bit-reduced digital data, that is, digital data that represents an audio information signal using a considerably fewer bits than would be required to represent the audio signal using conventional pulse-code modulation (PCM) techniques. In particular, it relates to an apparatus for high-speed copying compressed digital data from a first recording medium to a second recording medium having a lower recording capacity. Compressed digital data is reproduced from the first recording medium at a constant bit-rate, the compressed digital data is bit reduced, and the bit-reduced digital data is recorded on the second recording medium at variable bit rate.

BACKGROUND OF THE INVENTION

The inventor's assignee has proposed in, e.g., Japanese Patent Application Nos. 2-221364 (1990), 2-221365 (1990), 2-222821 (1990), and 2-222823 (1990), a technology for compressing a digital audio input signal and recording the compressed digital signal on a recording medium in bursts of a predetermined volume of data.

With this technique, a magneto-optical disc is used as the recording medium on which is recorded adaptive differential PCM (ADPCM) audio data, as prescribed in the CD-I (CD-Interactive) or CD-ROM XA audio data formats. The ADPCM data is recorded in bursts on the magneto-optical disc, with, e.g., 32 sectors of the ADPCM data together with several linking sectors, which are used to accommodate interleaving, as a recording unit.

In a recording and reproducing apparatus employing a magneto-optical disc, one of several recording and reproduction modes may be selected for the ADPCM audio data. Modes A, B, and C, in which normal CD data is compressed with compression ratios of two, four, and eight times, have been defined. In mode B, for example, the digital audio data is compressed with a compression ratio of four, so that the maximum playback time of a disc recorded using mode B is four times that of a disc recorded with the standard CD format (CD-DA format). This enables the size of the apparatus to be reduced because a playing time comparable with that of a standard 12 cm CD can be achieved using a smaller-sized disc.

The recording track velocity relative to the pickup head (the "recording velocity") of the smaller-sized disc recorded with Mode B compressed digital data is chosen to be the same as that of a standard CD. This means that the volume of compressed digital data reproduced from the disc per unit time is four times the volume of digital data required by a Mode B decoder. For this reason, the same sector or cluster of compressed digital data is read from the disc four times, but compressed digital data corresponding to reading the data from the disc once is sent to the decoder.

The data is recorded on the disc on a spiral track. When reproducing the track, the head is caused to execute a radial track jump each complete revolution of the disc. The track jump returns the head to its original position on the track. Causing the head to execute four track jumps causes the head to read the same part of the track four times repeatedly. This method of reproducing the track is advantageous, especially when used in a small-sized portable apparatus, since it enables satisfactory reproduction to be obtained even if accurate compressed data is obtained in only one of the four readout operations. The method therefore provides a strong immunity against reproduction errors caused by physical disturbances and the like.

In future, semiconductor memories are expected to be used as a recording medium for digital audio signals. To enable semiconductor memories to provide a usable playing time, it is necessary to increase the compression ratio further by using variable bit rate compression encoding, such as entropy encoding. Specifically, it is anticipated that audio signals will be recorded and/or reproduced using IC cards employing semiconductor memories. Audio data compressed using variable bit rate compression will be recorded on and reproduced from the IC card.

Although the playing time of an IC card is expected to increase, and the cost of an IC card is expected to decrease, with progress in semiconductor technology, it is feared that the IC card, which has barely started to be supplied to the market, will initially be expensive and have a short playing time. Therefore, it is thought that an IC card might early on be used by transferring to it part of the contents of another, less expensive, larger capacity, recording medium, such as a magneto-optical disc. Data exchange and re-recording operations would be conducted between the IC card and the magneto-optical disc. Specifically, a desired one or more selections recorded on the magneto-optical disc may be copied to the IC card. The copied selections would then be replaced by other selection(s) when desired. By repeatedly exchanging the selections recorded on the IC card, a variety of selections may be played on a portable IC card player using a small number of available IC cards.

SUMMARY AND OBJECTS OF THE INVENTION

When a selection recorded on a magneto-optical disc is reproduced and copied to the IC card, it is desirable to effect further data compression beyond the data compression existing on the magneto-optical disc. This is because the cost per bit recorded on the IC card is much higher than the cost per bit recorded on the magneto-optical disc.

The invention provides an apparatus for making a recording, on a recording medium, of a recording signal in response to compressed digital data representing an audio information signal. The recording, upon reproduction from the recording medium, conversion to an analog signal, and reproduction of the analog signal, is for perception by the human ear. The apparatus includes a device that receives the compressed digital data. The apparatus also has a bit removing device that derives the recording signal by removing redundant bits from the compressed digital data. Redundant bits are bits that make no difference to quantization noise perceived by the human ear. Finally, the apparatus includes a device that records the recording signal on the recording medium. The recording signal has a variable bit rate.

The invention also provides a high-speed copying apparatus that reproduces compressed digital data representing an audio information signal from a first recording medium. The apparatus derives a recording signal from the reproduced compressed digital data, makes a recording on a second recording medium using the recording signal. The recording on the second recording medium, upon reproduction, conversion to an analog signal, and reproduction of the analog signal, is for perception by the human ear. The apparatus includes a device that reproduces the compressed digital audio data from the first recording medium. The reproduced compressed digital data has a constant bit rate. A device derives the recording signal by removing redundant bits from the reproduced compressed digital data. Redundant bits are bits that make no difference to quantization noise perceived by the human ear. Finally, the apparatus includes a device that records the recording signal on the second recording medium. The recording signal has a variable bit rate.

In a method according to the invention of removing bits from compressed digital data to provide an output signal, the compressed digital data represents an audio information signal. The compressed digital data is derived from the audio information signal by digitizing the audio information signal, dividing the digitized audio information signal by time into a plurality of blocks, orthogonally transforming each block to provide a plurality of spectral coefficients, and adaptively quantizing the spectral coefficients grouped into critical bands to provide compressed digital data having a constant bit rate. The output signal, upon conversion to an analog signal and reproduction of the analog signal, is for perception by the human ear. The method comprises the steps of receiving the compressed digital data and processing the quantized spectral coefficients of the compressed digital data to derive the output signal by removing at least some redundant bits quantizing the spectral coefficients. Redundant bits are bits that make no difference to quantization noise perceived by the human ear.

BRIEF DESCRIPTION OF THE DRAWINGS

FIG. 11 part (a) shows the real-time data of two selections prior to recording on the magneto-optical disc.

FIG. 11 part (b) shows the data of the two selections recorded on the magneto-optical disc.

FIG. 11 part (c) shows the data of the two selections following reproduction from the magneto-optical disc and bit reduction to produce a recording signal with a variable bit rate.

FIG. 11 part (d) shows the variable bit-rate recording signal after recording on the IC card.

FIG. 11 part (e) shows the variable bit-rate recording signal reproduced from the IC card, filled with zeroes, and expanded to provide short-duration, real-time signals for monitoring.

DETAILED DESCRIPTION OF THE INVENTION

1. OVERVIEW OF THE APPARATUS

Figure 1:
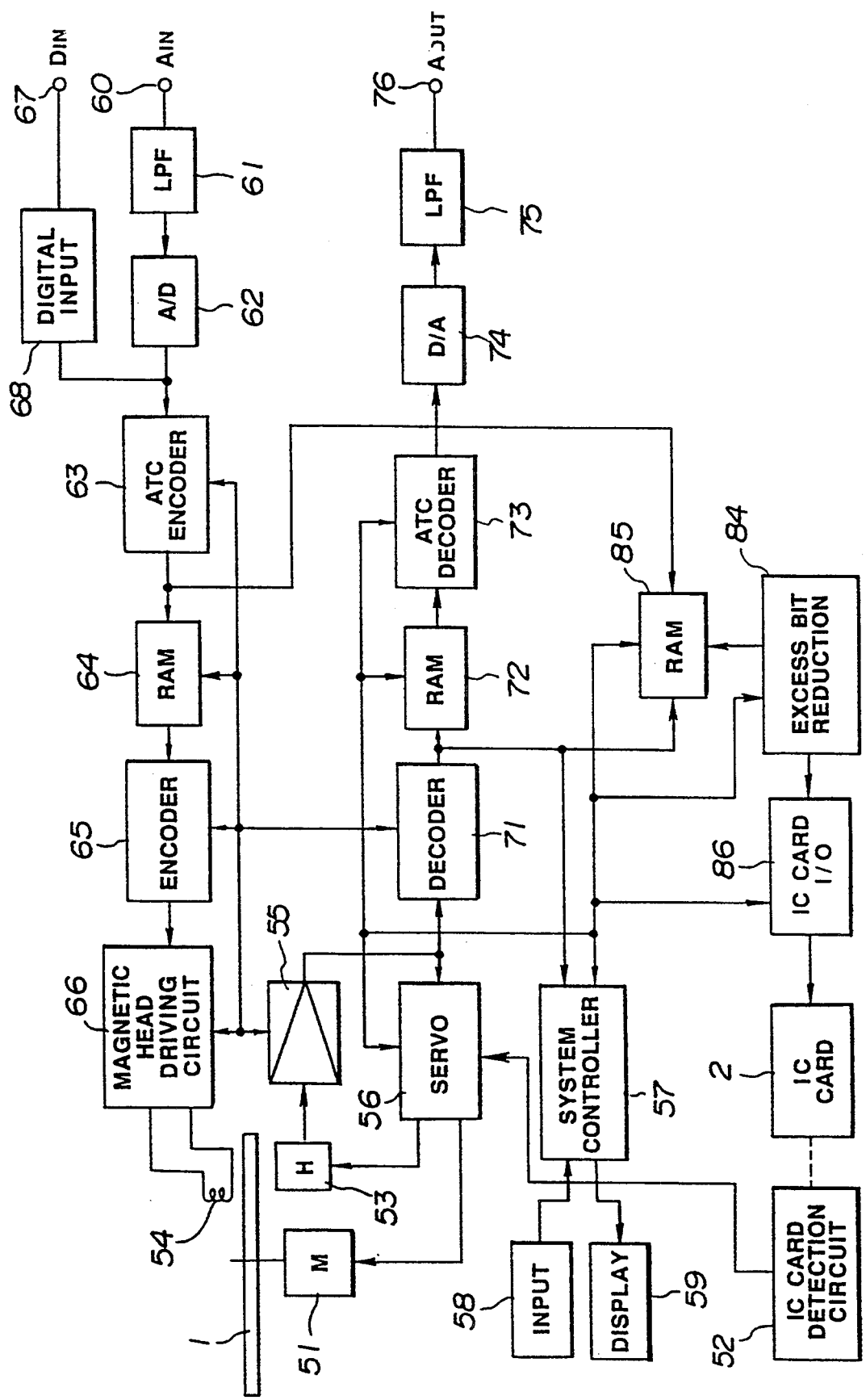
FIG. 1 is a block circuit diagram showing an apparatus according to the invention for high-speed copying digital data in which compressed digital data is reproduced from a first recording medium, the reproduced compressed digital data is bit reduced, and the bit-reduced compressed digital data is recorded on a second recording medium.

FIG. 1 is a block circuit diagram showing a schematic arrangement of an embodiment of an apparatus for high-speed copying compressed digital data to which the bit reduction techniques according to the present invention are applied.

The apparatus shown in FIG. 1 comprises a recording and reproducing unit 9 for a first recording medium, such as a magneto-optical disc 1, and a recording unit 4 for a second recording medium, such as the IC card 2. The recording unit 4 may additionally be capable of reproducing bit-reduced digital data from the IC card 2. The IC card recording unit may alternatively record on a variety of IC memories, such as an IC memory cartridge or an IC memory pack.

When copying signals from the magneto-optical disc 1 to the IC card 2, the decoder 71 processes the compressed digital audio data read from the magneto-optical disc 1 by the optical head 53. The decoder 71 applies eight-to-fourteen modulation (EFM) demodulation and de-interleaving or error correction to the data read from the disc to provide adaptive transform encoding (ATC) encoded audio data. The ATC encoded audio data is written into the memory 85 of the IC card recording unit 4, where it is processed by the excess bit reduction circuit 84. The excess bit reduction circuit subjects the ATC encoded audio data to bit reduction, and the resulting bit-reduced data is recorded on the IC card 2 by the IC card interface circuit 86.

In the process just described, the compressed digital data reproduced from the magneto-optical disc is fed into the IC card recording and reproduction system 4 in a compressed state, that is, in the state in which the digital data has not expanded by the ATC decoder 73. The unexpanded digital data is bit reduced to provide a variable bit rate before being recorded on the IC card 2.

The apparatus has two operating modes for reproducing the first recording medium, e.g., the magneto-optical disc 1; a normal mode and a high-speed copy mode. In the normal reproduction mode, compressed digital data is reproduced from the disc intermittently or in bursts. The compressed digital data is formatted in recording unit that contains predetermined volume of data. For example, a recording unit can consist of 32 sectors of data, together with several additional sectors to accommodate the additional volume of data resulting from interleaving the data in the 32 sectors. The reproduced data is expanded and decoded into analog audio signals.

In the high-speed copy mode, in which data is copied from the first recording medium to the second recording medium, the IC card in the example shown, the compressed data on the first recording medium is read out continuously and is continuously fed to the second recording medium, where it is continuously recorded. This results in high-speed or short duration copying, the increase in copying speed being equal to the compression ratio of the digital data on the first recording medium.

2. APPARATUS CIRCUIT DESCRIPTION (a) The Magneto-Optical Disc Mechanism

The circuit shown in FIG. 1 will now be described in detail. In the magneto-optical disc recording and reproducing unit 9 of the high-speed copying apparatus, the recording medium is the magneto-optical disc 1, which is rotationally driven by a spindle motor 51.

Data is recorded along a recording track on the magneto-optical disc 1 using magnetic field modulation recording. In this, a magnetic field, modulated in accordance with the recording data, is applied to the magneto-optical disc by the magnetic head 54, driven by the head driver circuit 66, and laser light is radiated onto the disc 1 by the optical head 53. The magnetic head and optical head together provide thermomagnetic recording in accordance with a magnetic field modulation recording.

Data is reproduced from the magneto-optical disc 1 by tracing the recording track using laser light from the optical head 53 to reproduce the recorded data photomagnetically.

The optical head 53 includes a laser light source, such as a laser diode, optical components, such as a collimator lens, object lens, polarization beam splitter or a cylindrical lens, and a photodetector having a light receiving section of a predetermined pattern. The optical head 53 is located facing the magnetic head 54 on opposite sides of the magneto-optical disc 1.

The optical head 53 also detects the laser light reflected from the recording track at the point at which data is written or read to enable the optical head to detect focusing errors and tracking errors.

When reproducing data from the magneto-optical disc 1, the optical head 53 detects the above-mentioned focusing errors and tracking errors. The optical head also detects the difference in the polarization angle (Kerr rotation angle) of the laser light reflected from the target track and from this generates a playback signal.

The output of the optical head 53 is fed into the RF circuit 55, which extracts the focusing and tracking signals from the output of the optical head 53 and supplies them to the servo control circuit 56. The RF circuit also converts the output of the optical head into binary signals, which it supplies to the decoder 71, which will be described in detail below.

The servo control circuit 56 consists of, for example, a focusing servo control circuit, a tracking servo control circuit, a spindle motor servo control circuit and a head feed servo control circuit. The focusing servo control circuit controls the optical system of the optical head 53 to reduce the focusing error signal to zero. The tracking servo control circuit also controls the optical system of the optical head to reduce the tracking error signal to zero. The spindle motor servo control circuit controls the spindle motor 51 to rotate the magneto-optical disc 1 to establish a constant linear velocity between the recording track and the optical head. The head feed servo control circuit causes the optical head and the magnetic head 54 to be moved radially to the recording track on the magneto-optical disc designated by the system controller 57.

(b) IC Card Interface

The IC card detection circuit 52 detects in some manner that the IC card 2 is loaded in the apparatus and capable of recording or reproducing signals. This can be done by detecting the IC card using a mechanical switch, or by a signal transmitted by the IC card 2 after the IC card is loaded in the apparatus. The IC card detection circuit transmits a signal to the servo control circuit 56, which sets the apparatus into its high-speed copy mode. In this mode, the spindle motor control circuit increases the rotational speed of the magneto-optical disc 1 and/or the head feed servo control circuit to decreases the number of track jumps carried out to increase the data rate.

The servo control circuit 56, while performing the abovementioned control operations, transmits information indicating the operating states of various parts controlled by it to other parts of the circuit.

(c) System Controller

The control key input 58 and the display 59 are connected to the system controller 57. The system controller controls the recording system and the reproducing system according to the operating mode selected by input information entered at the operating key input 58. The system controller 57 also controls the positions of the optical head 53 and the magnetic head 54 on the recording track in both record and playback, in response to sector-by-sector address information, including header time or subcode Q data, reproduced from the recording track of the magneto-optical disc 1.

The system controller 57 also causes data compression mode information to be displayed on the display 59 in response to data compression mode information from the ATC encoder 63. In the record mode, the data compression mode is selected by the operating key input 58. In the playback mode, data compression mode information comes from the reproduced data generated by the RF circuit 55 and the rest of the reproducing system, as will be described below.

Finally, the system controller 57 displays the playback time on the display 59 in response to the data compression ratio of the designated data compression mode and position information reproduced from the recording track. The sector-by-sector address information (absolute time information), including header time or sub-code Q data, reproduced from the recording track of the magneto-optical disc 1, is multiplied by the data compression ratio of the designated data compression mode to provide the real playback time. For example, if the data compression ratio is 4, the absolute time is multiplied by 4 to provide the real playback time. The time information is displayed on the display 59. If absolute time information was preformatted on the recording track of the magneto-optical disc in the course of making the recording, the preformatted absolute time information may be read and multiplied by the data compression ratio to display the real playback time of the current position of reproduction.

(d) Magneto-Optical Disc Recording System

In the recording system of the recording and reproducing unit 9 of the high-speed copying apparatus, the analog audio input signal from the input terminal 60 is supplied, via the low-pass filter 61, to the analog-to-digital (A/D) converter 62. The A/D converter converts the analog audio input signal $A_{IN}$ to a PCM digital input signal. The digital input signal from the A/D converter is supplied to the adaptive transform coder (ATC) encoder 63. A PCM digital audio input signal $D_{IN}$ from the input terminal 67 is supplied, via the digital input interface circuit 68, to the ATC encoder 63.

The ATC encoder 63 receives the digital input signal at a prescribed data rate and subjects it to data compression according to the one of the various data compression modes of the above-mentioned CD-I system designated by the system controller 57. For example, if the designated data compression mode is the mode in which data is compressed data fed into the memory 64 with a sampling frequency of 44.1 kHz and four bits per sample, the data rate is reduced to one fourth of the data rate of the standard CD-DA format, i.e., from 75 sectors/second to 18.75 sectors/second.

In the embodiment shown in FIG. 1, it is assumed that the sampling frequency of the A/D converter 62 is the same as the sampling frequency of the standard CD-DA format, i.e., 44.1 kHz. It is also assumed that data compression from 16 bits to 4 bits is carried out in the ATC encoder 63 after conversion of the sampling rate to that corresponding to the designated compression mode. Alternatively, the sampling frequency of the A/D converter 62 may be switched as a function of the data compression mode, in which case the cut-off frequency of the low-pass filter 61 should also be switched accordingly. The sampling frequency of the A/D converter 62 and the cut-off frequency of the low-pass filter 61 are preferably simultaneously controlled and switched as a function of the compression mode. If the sampling frequency is not changed with the bit compression mode, a fixed limitation of the frequency band corresponding to the mode with the smallest number of the bits should be used.

Although it is possible for the compressed digital data from the ATC 63 to be recorded into one of every four sectors, as described above, it is preferred to record the data into sectors continuously, as will be explained below, because recording into one of every four sectors is very difficult. To achieve this, recording is performed in bursts at a data rate of 75 sectors/second, i.e., at the same data rate as that of the standard CD-DA format. Recording is performed in recording units having clusters of a predetermined number of sectors as a recording unit. Preferably each cluster includes 32 sectors, plus several additional sectors to accommodate the additional data resulting from interleaving the recording data in the 32 sectors.

Under control of the system controller 57, the ATC digital data in the designated data compression mode is written continuously into the memory 64 at the data rate of 18.75 sectors/second of the designated data compression mode. Also under control of the system controller, the ATC digital data is read out from the memory as recording data in bursts at the data rate of 75 sectors/second. The overall data rate for the data read out from the memory and recorded, inclusive of the non-recording period, is the low rate of 18.75 sectors/second. However, the instantaneous data rate during burst recording is the standard rate of 75 sectors/second. This way, if the recording velocity of the magneto-optical disc 1 is such as to provide the same recording velocity as the standard CD-DA format, the recording on the magneto-optical disc has the same recording density and the same recording pattern as a CD-DA format recording.

The ATC digital audio data read out in bursts from the memory 64 at an instantaneous rate of 75 sectors/second is supplied to the encoder 65 as recording data. In the encoder, the recording data is formed into a continuous recording unit that is made up of a cluster consisting of a plurality of, preferably, 32 sectors, together with several cluster-linking sectors arrayed before and after the cluster. The number of cluster-linking sectors is set so that the cluster-linking sectors can accommodate the additional data that results from interleaving the recording data in the cluster. This way, each cluster and its cluster-linking sectors form a self-contained unit, unaffected by adjoining clusters.

The encoder 65 additionally processes the recording data read out in bursts from the memory 64 by subjecting it to encoding for error correction, such as parity appending and interleaving, and subjecting it to eight-to-fourteen (EFM) encoding. The encoded recording data from encoder 65 is fed into the magnetic head driving circuit 66. The head driving circuit is connected to the magnetic head 54 and causes the magnetic head to apply a magnetic field, modulated in accordance with the encoded recording data, to the magneto-optical disc 1.

The system controller 57 controls the position of the optical head 53 and the magnetic head 54 on the recording track of the magneto-optical disc 1 so that the recording data read out from the memory 64 in bursts is recorded on the recording track of the magneto-optical disc. The system controller also supplies a control signal designating the recording position on the recording track of the magneto-optical disc to the servo control circuit 56.

(e) Magneto-Optical Disc Reproducing System

The reproducing system of the magneto-optical disc recording and reproducing unit 9 will now be described.

The reproducing system reproduces the data continuously recorded on the recording track of the magneto-optical disc 1 by the above-mentioned recording system, and includes the decoder 71. The optical head 53 illuminates the disc 1 with laser light and generates a playback output signal in response to light reflected from the disc. The playback output signal is fed into the RF circuit 55 where it is converted into a binary playback signal, which is fed into the decoder.

The decoder 71 is the counterpart of the encoder 65 of the recording system described above. The decoder processes the binary playback signal from the RF circuit 55 by applying EFM decoding, error correction, and de-interleaving to provide reproduced ATC digital audio data in the above-mentioned designated data compression mode at a data rate of 75 sectors/second. This is faster than the data rate of the designated data compression mode.

Under control of the system controller 57, playback data from the decoder 71 is repetitively written into the memory 72 in bursts at a data rate of 75 sectors/second, and is continuously read out from the memory at the data rate of 18.75 sectors/second, corresponding to the designated data compression mode.

The system controller 57 also controls the position of the optical head 53 on the recording track of the magneto-optical disc 1 to cause the playback data repetitively written in bursts into the memory 72 to be continuously reproduced from the recording track of the disc 1. The system controller supplies a control signal designating the playback position on the recording track of the magneto-optical disc to the servo control circuit 56.

The ATC digital audio data in the designated data compression mode, as playback data, is read out continuously from the memory 72 at a data rate of 18.75 sectors/second, and is fed into the ATC decoder 73. The ATC decoder is complementary to the ATC encoder 63 of the recording system. The operating mode of the ATC decoder is designated by the system controller 57. The ATC decoder 73 expands the 4-bit playback data by a factor of four to provide a 16-bit digital audio signal. The digital audio signal from ATC decoder 73 is fed into the digital-to-analog (D/A) converter 74.

The D/A converter 74 converts the digital audio signal from the ATC decoder 73 into analog signals which pass through the low-pass filter 75 to provide the analog audio output signals $A_{OUT}$ at the output terminal 76.

(f) IC Card Recording System

The digital audio input signal, obtained by digitally converting the analog audio input signals $A_{IN}$ supplied from input terminal 60 via low-pass filter 61 in the A/D converter 62, or fed in directly through the digital input 67, and encoded by the ATC encoder 63, is bit reduced to increase the amount of data compression for recording on the IC card 2. The IC card recording system will be next be described.

The ATC audio data provided by the ATC encoder 63 is passed into the excess bit reduction circuit 84 via the memory 85, which acts as a buffer. The excess bit reduction circuit 84 is a type of variable bit rate encoder. In the excess bit reduction circuit 84, bits which give a noise level below the masking threshold are removed. This processing is carried out in the course of writing data into and reading data out of the memory 85. The bit-reduced digital data from the excess bit reduction circuit 84 is recorded on the IC card 2 by the IC card interface circuit 86. Variable length coding, which takes advantage of removing correlated stereo components or so-called entropy coding, may be also performed before recording the data on the IC card 2.

(g) High-Speed Digital Copying

The high-speed copy mode of the high-speed copying apparatus will now be described.

The system controller 57, in response to the high-speed copy key of the control key input 58, sets the apparatus into its high-speed copy mode. In response to the system controller, the magneto-optical disc 1 is reproduced continuously (i.e., no track jumps are performed) and reproduced compressed data from the decoder 71 is supplied directly, i.e., without expansion, to the memory 85 in the IC card recording system 4. The compressed data is processed by the excess bit reduction circuit 84 to provide a variable bit-rate, and is then recorded on the IC card 2 via the IC card interface circuit 86. If ATC data is recorded on the magneto-optical disc in the designated data compression mode, a four-times normal volume of compressed data is continuously read out from the disc, and hence from the decoder 71.

Thus, during high-speed copying, compressed data corresponding to a fourfold time duration in real time (in the case of the designated data compression mode) is continuously reproduced from the magneto-optical disc 1 and is recorded on the IC card 2 after variable length encoding, so that high-speed copying at four times normal speed can be carried out.

The copying speed ratio can be varied by using a different data compression mode. Copying may also be performed at a copying speed ratio greater than the compression ratio if the magneto-optical disc 1 is rotationally driven to provide a recording velocity that is a multiple of the normal recording velocity.

Figure 2:
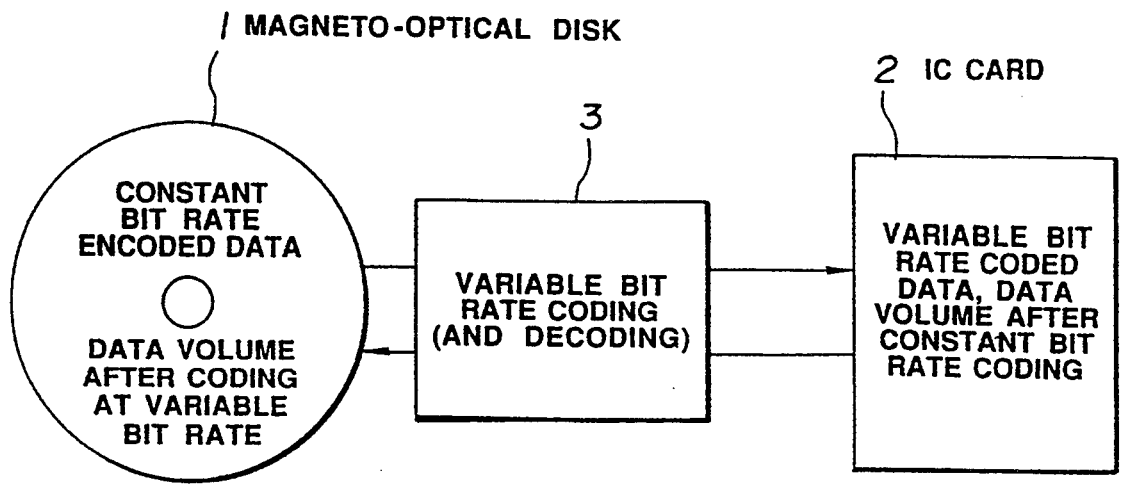
FIG. 2 shows the recording contents of a magneto-optical disc and an IC card.

Referring to FIG. 2, compressed digital data with a constant bit rate is recorded on the magneto-optical disc 1 together with information regarding the data volume required for the data after the compressed data has been bit removed using the bit reduction encoder 3, i.e., the data recording capacity required on the IC card 2 to record the data. In this manner, the number of selections recorded on the magneto-optical disc 1 which may be copied to the IC card 2, or the combination of these selections, may be known instantly by reading out the data volume information from the magneto-optical disc.

Additionally, if not only the data volume required by the bit reduced data, but also the data volume required for the constant bit-rate compressed data, prior to bit reduction, are recorded on the IC card 2, the data volume required on the magneto-optical disc I when selections are copied from the IC card 2 to the magneto-optical disc may also be known instantly.

(g) View of the Apparatus

Figure 3:
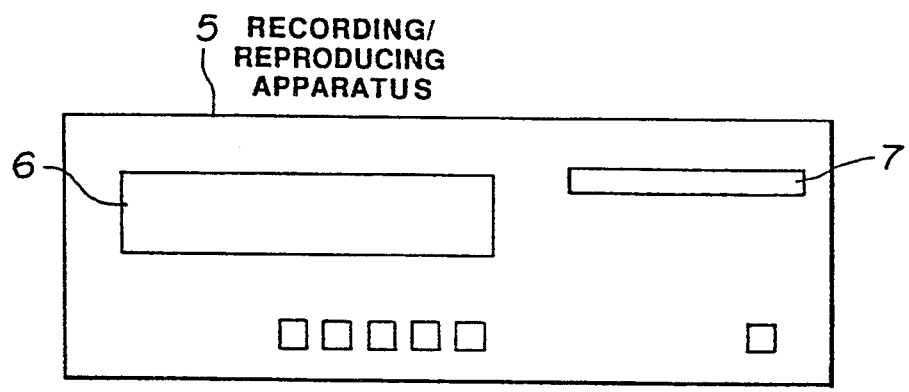
FIG. 3 is a front view of the apparatus shown in FIG. 1.

FIG. 3 shows a front view of the high-speed copying apparatus 5, the circuit of which is shown in FIG. 1, provided with a magneto-optical disc inserting section 6 and an IC card inserting slot 7.

3. DATA COMPRESSION

In connection with the ATC encoder and decoder of FIG. 1, the technique of compressing a digital input signal, such as a PCM audio input signal, using the techniques of sub-band coding (SBC), adaptive transform coding (ATC) and adaptive bit allocation (APC-AB) will now be described by referring to FIG. 4 et seq.

(a) Overview

Figure 4:
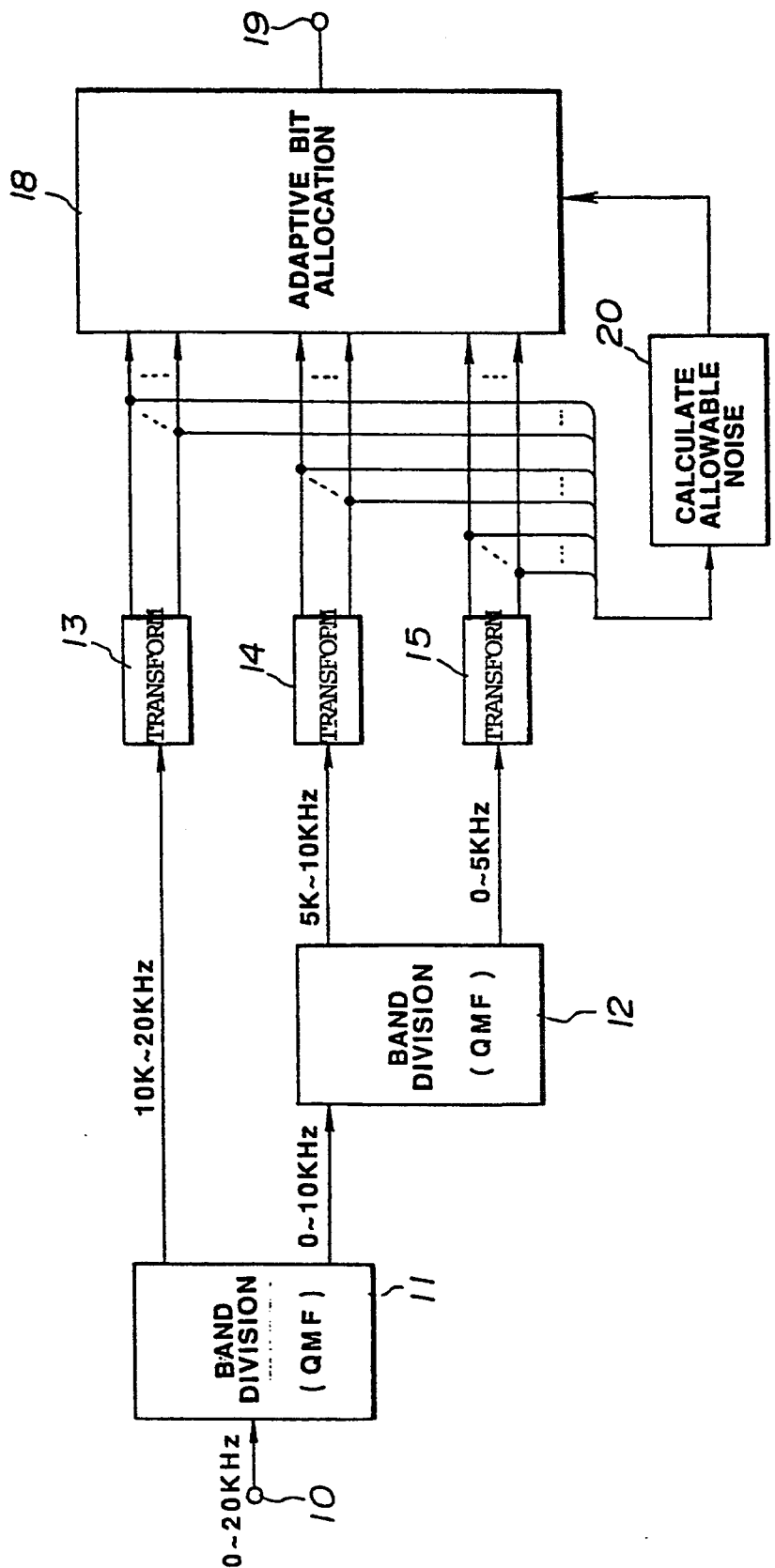
FIG. 4 is a block circuit diagram showing a practical example of a circuit which may be used to compress a digital input signal to provide compressed digital data with a constant bit rate.

In the encoding apparatus shown in FIG. 4, a digital input signal is are divided in frequency into plural frequency ranges by means of filters so that the widths of the frequency ranges increase with increasing frequency. The resulting signal in each of the frequency ranges is divided in time into frames. An orthogonal transform is carried out on blocks of data obtained by time dividing each frame of data in each frequency range by a divisor of at least one. The resulting spectral coefficients on the frequency axis grouped into critical bands, and adaptive bit allocation is carried out to allocate the total number of available quantization bits among the critical bands. Grouping the spectral coefficients into critical bands takes into account the psychoacoustic characteristics of the human hearing mechanism, as will be explained below.

(b) Time and Frequency Division

The digital signals at the outputs of the frequency range dividing filters are divided along the time axis into a plurality of frames. The orthogonal transforms are performed on blocks of data obtained by dividing the frames in time by an integral divisor of one or more. The length of the blocks in each of the frequency ranges, i.e., the number of samples per block, is adaptively changed as a function of the input signal.

The encoder circuit also includes floating point processing. Floating point processing is a normalization process that reduces the number of bits required to represent, for example, one frame. This reduces the complexity of orthogonal transform circuitry. Floating point processing can be applied to each frame, to a block obtained by subdividing a frame, or to groups of frames. Additionally, floating point processing can be applied to the spectral coefficients resulting from the orthogonal transform. Floating point processing can be applied to each critical band, to a group of critical bands, or, in critical bands at higher frequencies, to a sub-band obtained by frequency subdivision of the critical band.

Referring to FIG. 4, an audio PCM signal in the frequency range of 0 Hz to 20 kHz is supplied to the input terminal 10. The spectrum of the input signal is divided into frequency ranges by the range-dividing filter 11. Preferably, a quadrature mirror filter (QMF) is used to divide the spectrum of the input signal into a 0 Hz to 10 kHz frequency range and into a 10 to 20 kHz frequency range. The 0 Hz to 10 kHz frequency range is further divided by a second range-dividing filter 12, which is also preferably a QMF filter, into a 0 Hz to 5 kHz frequency range and a 5 to 10 kHz frequency range.

The signals in the 10 kHz to 20 kHz frequency range from the range-dividing filter 11 are connected to a orthogonal transform circuit 13. The signals in the 5 kHz to 10 kHz frequency range from the range-dividing filter 12 are connected to the orthogonal transform circuit 14. The signals in the 0 to 5 kHz frequency range from the range-dividing filter 12 are connected to the orthogonal transform circuit 15. The orthogonal transform circuits 13, 14, and 15 are preferably modified discrete cosine transform (MDCT) circuits. Other suitable orthogonal transform circuits, such as Discrete Fourier Transform (DFT) circuits, can alternatively be used.

A discussion of MDCT processing may be found in, for example, J. P. Princen and A. B. Bradley, *Subband/Transform Coding Using Filter Bank Based on Time Domain Aliasing Cancellation*, ICASSP 1987.

(c) Block Lengths

Figure 5:
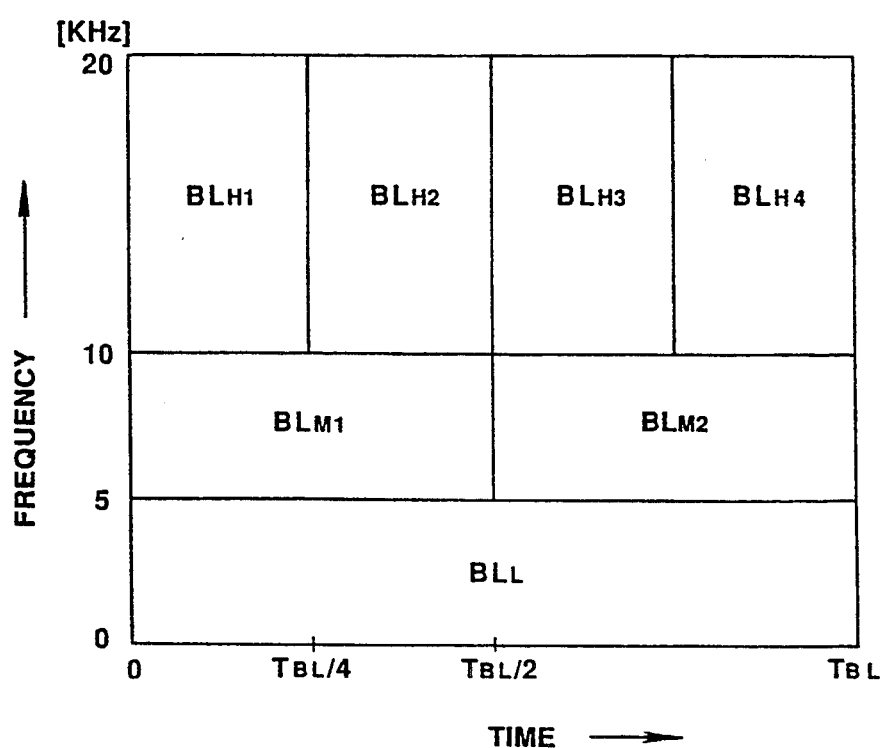
FIG. 5 shows a practical example of how the digital input signal is divided into frequency ranges, and how the frequency ranges are divided in time into frames, which are sub divided into blocks, in the circuit shown in FIG. 4.

FIG. 5 shows practical examples of how a frame of input signal data is divided into blocks having different block lengths in the different frequency ranges. Orthogonal transforms are carried out on the blocks of data in the orthogonal transform circuits 13 through 15. In the practical examples shown in FIG. 5, the frequency range is wider and the time resolution is greater (that is, the block length is shorter) with increasing frequency. There are 1024 samples in the frame, and also 1024 samples in the block $BL_L$ for signals in the low-frequency range of 0 Hz to 5 kHz. The same frame of input data in the middle-frequency range of 5 to 10 kHz is divided into two blocks $BL_{M1}$ and $BL_{M2}$, each having a block length equal to one-half of the block length $T_{BL}$ of the low-frequency range block $BL_L$, i.e., $T_{BL}/2$. The frame of input data in the high-frequency range of 10 to 20 kHz is divided into four blocks $BL_{H1}$, $BL_{H2}$, $BL_{H3}$, $BL_{H4}$, each having a block length equal to one-fourth of the block length $T_{BL}$ of the low-frequency range block $BL_L$ (and the frame length), i.e., $T_{BL}/4$.

If the input signal has a frequency range of 0 Hz to 22 kHz, the low-frequency range is 0 Hz to 5.5 kHz, the middle-frequency range is 5.5 to 11 kHz, and the high-frequency range is 11 to 22 kHz.

Returning to FIG. 4, the spectral coefficients obtained after processing the blocks of data by the orthogonal transform circuits 13 to 15 are grouped together into critical bands before being supplied to an adaptive bit allocation encoding circuit 18.

(d) Masking, Critical Bands, and Quantization Noise

The invention takes advantage of a psychoacoustic property of the human hearing mechanism called "masking." Masking is a psychoacoustic phenomenon in which a signal is rendered inaudible, or "masked," by other signals occurring simultaneously with, or slightly earlier than, or later than, the signal. Masking effects may be classed into time axis masking effects, that is, masking by signals occurring earlier or later than the masked signal, and concurrent masking effects, which is masking is by simultaneously-occurring signals having a frequency different from the frequency of the masked signal.

Masking enables a signal to render inaudible any noise within its time or frequency masking range. This means that a digital encoding system that produces quantizing noise may have quantizing noise levels that are high compared with the noise level that is allowable in the absence of a signal provided that the quantizing noise lies within the masking range of the signal. Since relatively high levels of quantizing noise are allowable if masked by the signal, the number of bits required to represent the signal, or parts of the signal, may be significantly reduced.

A critical band is a measure of the range of frequencies that can be masked by a signal. A critical band is the band of noise that can be masked by a pure signal that has the same intensity as the noise and has a frequency in the middle of the critical band. The width of successive critical bands increases with increasing frequency of the pure signal. The audio frequency range of 0 Hz to 20 kHz is normally divided into, e.g., 25 critical bands.

In this description of the invention, reference will occasionally be made to the quantization noise of a compressed (or bit reduced) digital signal. The quantizing noise of a compressed (or bit reduced) digital signal is the quantization noise that results when the compressed digital signal is expanded and converted to an analog signal. The quantizing noise of a compressed (or bit reduced) digital signal representing an audio information signal, perceived by a listener is the quantization noise perceived by the listener when the compressed digital signal is expanded, converted to an analog signal, and the analog signal is reproduced over a loudspeaker for perception by the human ear.

(e) Allowable Noise Calculation Circuit

In the encoder circuit shown in FIG. 4, quantization bits are allocated among the critical bands for quantizing the spectral coefficients in each critical band in response to the allowable noise calculating circuit 20. The allowable noise calculating circuit 20 receives the spectral coefficients from the orthogonal transform circuits 13, 14, and 15, determines the allowable noise level for each critical band, taking into account masking effects. From the allowable noise level in each band and the energy or peak signal amplitude in each band, the allowable noise calculating circuit determines the number of bits to allocate to each critical band for quantizing the spectral coefficients in the critical band. The adaptive bit allocation circuit then re-quantizes the spectral coefficients using to the number of bits allocated to each critical band by the allowable noise calculation circuit. The data quantized in this manner is supplied to the output terminal 19 as the compressed digital output signal.

Figure 6:
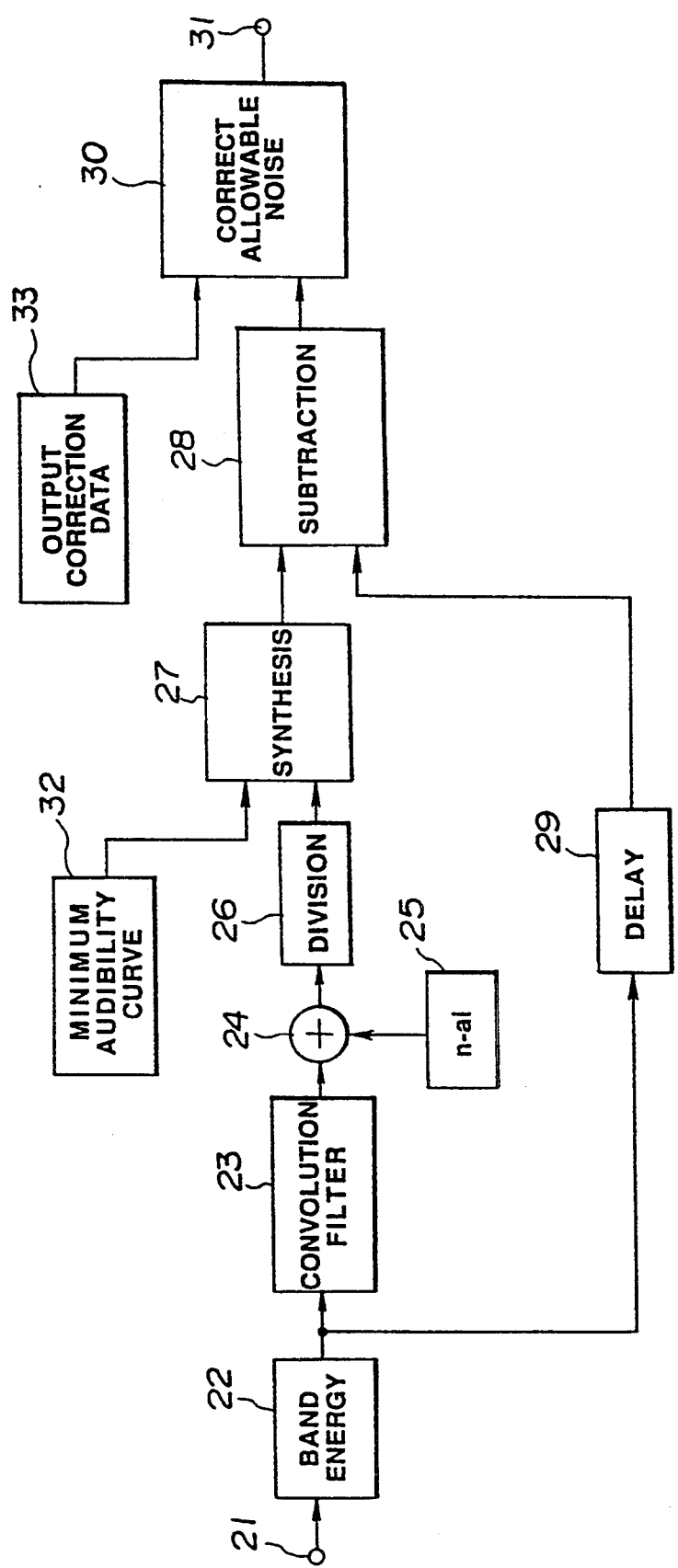
FIG. 6 is a block circuit diagram of the allowable noise calculating circuit of the circuit shown in FIG. 4.

FIG. 6 shows block diagram of a practical example of the allowable noise calculating circuit 20. The spectral coefficients are supplied by the orthogonal transform circuits 13 through 15 (FIG. 4) to the input terminal 21.

Figure 7:
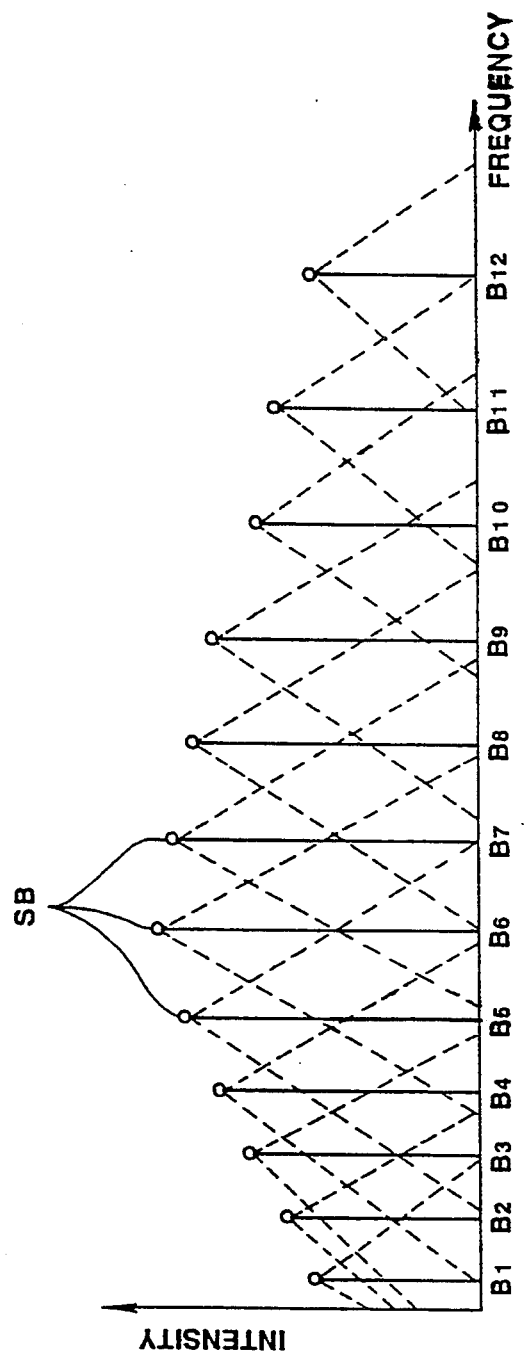
FIG. 7 is a graph showing a Burke spectrum.

The spectral coefficients are supplied to the energy calculating circuit 22 in which the energy for each critical band is found by calculating the sum of the amplitudes of the spectral coefficients in each critical band. The band energies can also be calculated by a root-mean-square calculation on the spectral coefficients. The peak or mean values of the amplitudes may also be used in place of band energies. The output of the energy calculating circuit 22 is a spectrum of the energies in the respective bands, and is called a Burke spectrum. FIG. 7 shows such a Burke spectrum SB of the energies in twelve successive critical bands. The figure only shows twelve critical bands, B1 through B12, for simplicity.

To take account of the effect of the Burke spectrum SB on masking, a convolution operation is carried out. In the convolution operation, the Burke spectrum data is multiplied by predetermined weighting coefficients and the resulting products are summed together. The convolution operation calculates the sum of the effects of the signal components in neighboring critical bands on the masking level in each critical band. These are indicated by the broken lines in FIG. 7.

The outputs of the energy calculating circuit 22, i.e., the values of the Burke spectrum data, are supplied to the convolution filter circuit 23. The convolution filter circuit 23 includes plural delay elements for sequentially delaying input data. The convolution filter also includes plural multipliers, each multiplier multiplying an output of a delay element by a filter coefficient, i.e., a weighting coefficient. Preferably, 25 multipliers are used, one for each critical band. As a practical example of the filter coefficients of the multipliers of the convolution filter circuit 23, if the filter coefficient of the multiplier M of a given critical band is 1, outputs of the respective delay elements are multiplied by 0.15, 0.0019, 0.000086, 0.4, 0.06 and 0.007 by the multipliers $M-1$, $M-2$, $M-3$, $M+1$, $M+2$ and $M+3$. M is an arbitrary number of from 1 to 25. Finally, the convolution filter circuit includes an adder for adding together the outputs of the multipliers.

The output of the convolution filter circuit 23 is supplied to an adder 24 to determine the level a corresponding to the allowable noise level in the convolved region. The level $\alpha$ is the level that gives an allowable noise level for each critical band by deconvolution as will be described below. A masking function, representing the masking level, for finding the level $\alpha$ is supplied to the subtractor 24. The level $\alpha$ is controlled by increasing or decreasing the masking function. The masking function is supplied by the masking function generator 25, which will be described next.

The level $\alpha$ corresponding to the allowable noise level is determined by:

$$\alpha = S - (n - ai) \quad (1)$$

where i is the number of the critical band, 1 being the number of the lowest frequency critical band, n and a are constants, a is greater than 0, S is the intensity of the convolved Burke spectrum, and $(n-ai)$ is the masking function. In the example of FIG. 6, no deterioration in sound quality is obtained with $n=38$ and $a=1$.

The level $\alpha$ is determined in the subtractor 24, and the result is fed into the divider 26, which deconvolves the level $\alpha$ in the convolved region. Thus, by deconvolution, the masking threshold may be found from the level $\alpha$. That is, the masking threshold becomes the allowable noise level. Although deconvolution normally requires complex processing, it is carried out in the example of FIG. 6 by the simple divider 26.

Figure 9:
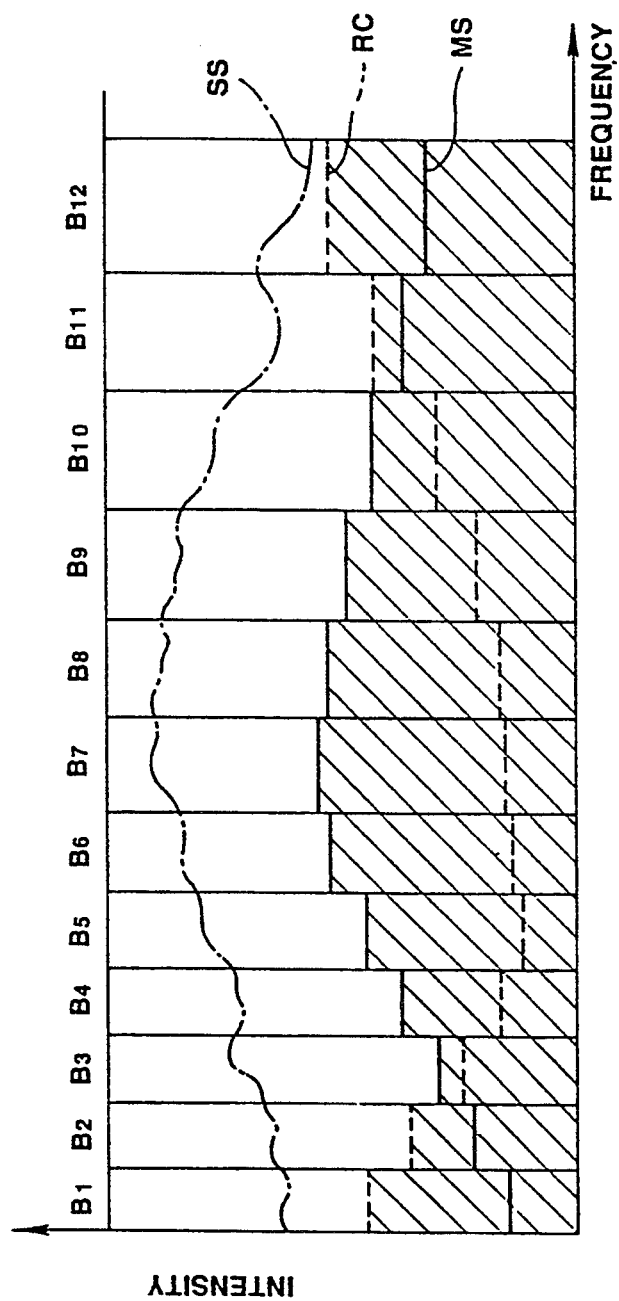
FIG. 9 is a graph showing the result of synthesizing the minimum audibility curve and the masking threshold.

The masking threshold is fed into the synthesis circuit 27, which additionally receives minimum audibility curve RC data from the minimum audibility curve generator 32. The minimum audibility curve data, representing another characteristic of the human hearing mechanism, as shown in FIG. 9, is combined with the abovementioned masking threshold MS.

Noise is inaudible if its absolute level is lower than the minimum audibility curve. The minimum audibility curve changes if, for example, the playback volume is changed, even if the encoding remains the same. However, in a practical system there are few, if any, significant differences in the way in which musical program material is fit within dynamic range provided by a 16-bit PCM system. Thus, it can be said that if the quantization noise at frequencies near 4 kHz, which is the frequency at which the ear is most sensitive, is inaudible, then quantization noise lower in level than the level of the minimum audibility curve can be thought of as being inaudible at other frequencies. Therefore, if it is assumed that the system is used such that the quantization noise near 4 kHz, for a certain quantizing word length, is inaudible, and that the allowable noise level is obtained by synthesizing the minimum audibility curve RC and the masking threshold MS, then the allowable noise level in each critical band will be the greater of the level of the minimum audibility curve and the level of the masking threshold. This is shown by the hatched lines in FIG. 9. In the present embodiment, the level of the minimum inaudibility curve at 4 kHz is matched to the minimum level corresponding to, e.g., quantization using 20 bits. FIG. 9 also shows the signal spectrum SS.

Figure 8:
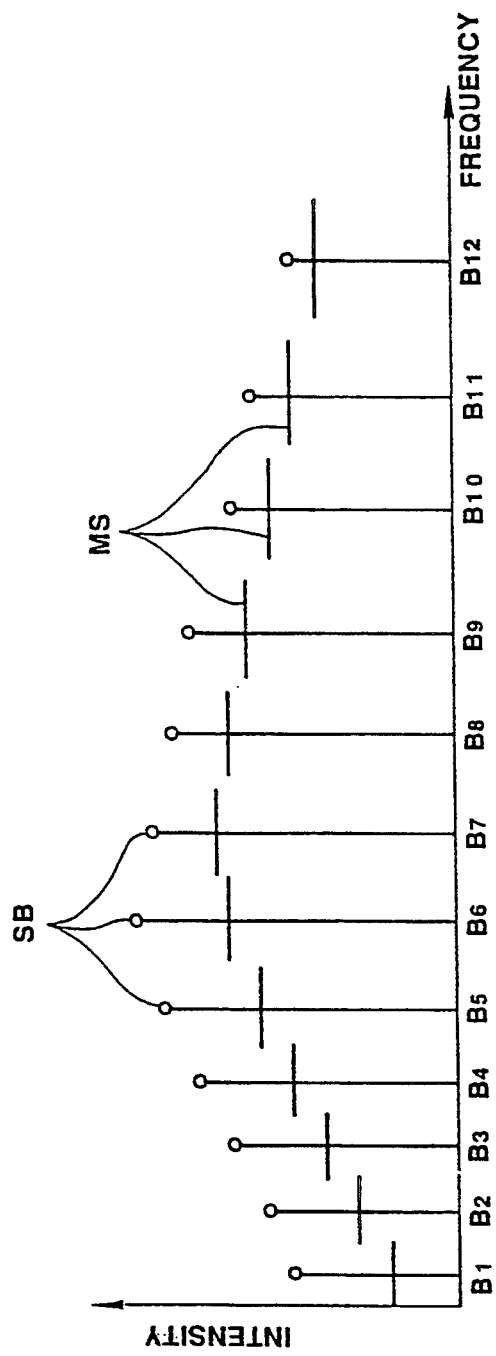
FIG. 8 is a graph showing a masking spectrum.

The output of the synthesis circuit 27 is passed to the subtractor 28, which is also supplied, via the delay circuit 29, with the output of the energy calculating circuit 22, i.e., with the Burke spectrum SB. The subtractor 28 subtracts the masking threshold MS from the Burke spectrum SB. This masks the part of the Burke spectrum having a level below the level of the masking threshold MS, as shown in FIG. 8. The delay circuit 29 is provided for delaying the Burke spectrum SB from the energy calculating circuit 22 because of processing delay in the circuits between the energy calculating circuit and the synthesis circuit.

The output of the subtractor 28 fed into the allowable noise correction circuit 30, which additionally receives the output of the output correction data circuit 33. The allowable noise correction circuit 30 corrects the allowable noise level data at the output of the subtractor 28 in response to, for example, equal loudness curve data provided by the output correction data circuit 33.

The equal loudness curve data characterizes yet another psychoacoustic characteristic of the human hearing mechanism. The equal loudness curve data corrects sound pressure levels at different frequencies so that they are perceived as sounding as loud as a pure sound at 1 kHz. The equal loudness curve has substantially the same characteristic as the minimum audibility curve shown in FIG. 9.

According to the equal loudness curve data, a sound in the vicinity of 4 kHz is perceived as being as loud as a sound at 1 kHz having a sound pressure level 8 to 10 dB higher. On the other hand, a sound in the vicinity of 50 Hz must have a sound pressure level some 15 dB higher than a sound at 1 kHz sound to be perceived as sounding as loud. Because of this, the allowable noise level data must be corrected using the equal loudness curve data to adjust the allowable noise level data for the loudness sensitivity of the human hearing mechanism.

The output correction data circuit 33 may also be used to correct the allowable noise level in response to the difference between the actual number of bits used by the encoding circuit 18 (FIG. 4) to quantize the spectral coefficients and the target number of bits, which is the total number of bits available for quantization. If the actual number of bits a previous adaptive bit allocation among the critical bands differs from the target number of bits, the allowable noise data must be changed to cause bits to be reallocated to reduce the difference to zero. For example, if the total number of bits allocated is less than the target value, the output correction data circuit reduces the allowable noise data to a cause a number of bits equal to the difference between the actual number of bits and the target number of bits to be distributed among the critical bands to provide additional bits. Alternatively, if the actual number of bits is more than the target number of bits, the output correction data circuit increases the allowable noise level to cause the number of bits corresponding to the difference between the actual number of bits and the target number of bits to be removed from the critical bands to remove excess bits.

To correct the actual number of bits, the difference between the actual number of bits and the target number of bits is measured and the output correction data circuit 33 provides error data that is used to correct the allowable noise level data, and hence the numbers of bits used for quantization in the critical bands.

Alternatively, a number of bits equal to the target number of bits may be distributed from the outset among the critical bands in a fixed allocation pattern. As a further alternative, bit allocation may also be carried out depending on the amplitude of the signals in the respective critical bands. In this case, the noise energy may be minimized.

(f) Bit Allocation

The output of the allowable noise correction circuit 30 is taken, via the output terminal 31, to a bit allocation circuit (not shown), which also receives the output of a ROM (not shown), which stores information concerning the numbers of allocated bits. The bit allocation circuit generates information concerning the numbers of bits to be allocated to each critical band in response to the ROM and the output from the allowable noise correction circuit 30.

The information concerning the numbers of the allocated bits is supplied to the adaptive bit allocation circuit 18 (FIG. 4) and the spectral coefficients from the orthogonal transform circuits 13, 14 and 15 in each critical band are quantized using the number of bits allocated to the critical band.

To summarize, the adaptive bit allocation circuit 18 quantizes the spectral coefficients in each critical band with the number of bits allocated to the critical band in accordance with the differences between the energies of the critical bands and the outputs of the noise level setting means.

4. BIT REDUCTION

Figure 10:
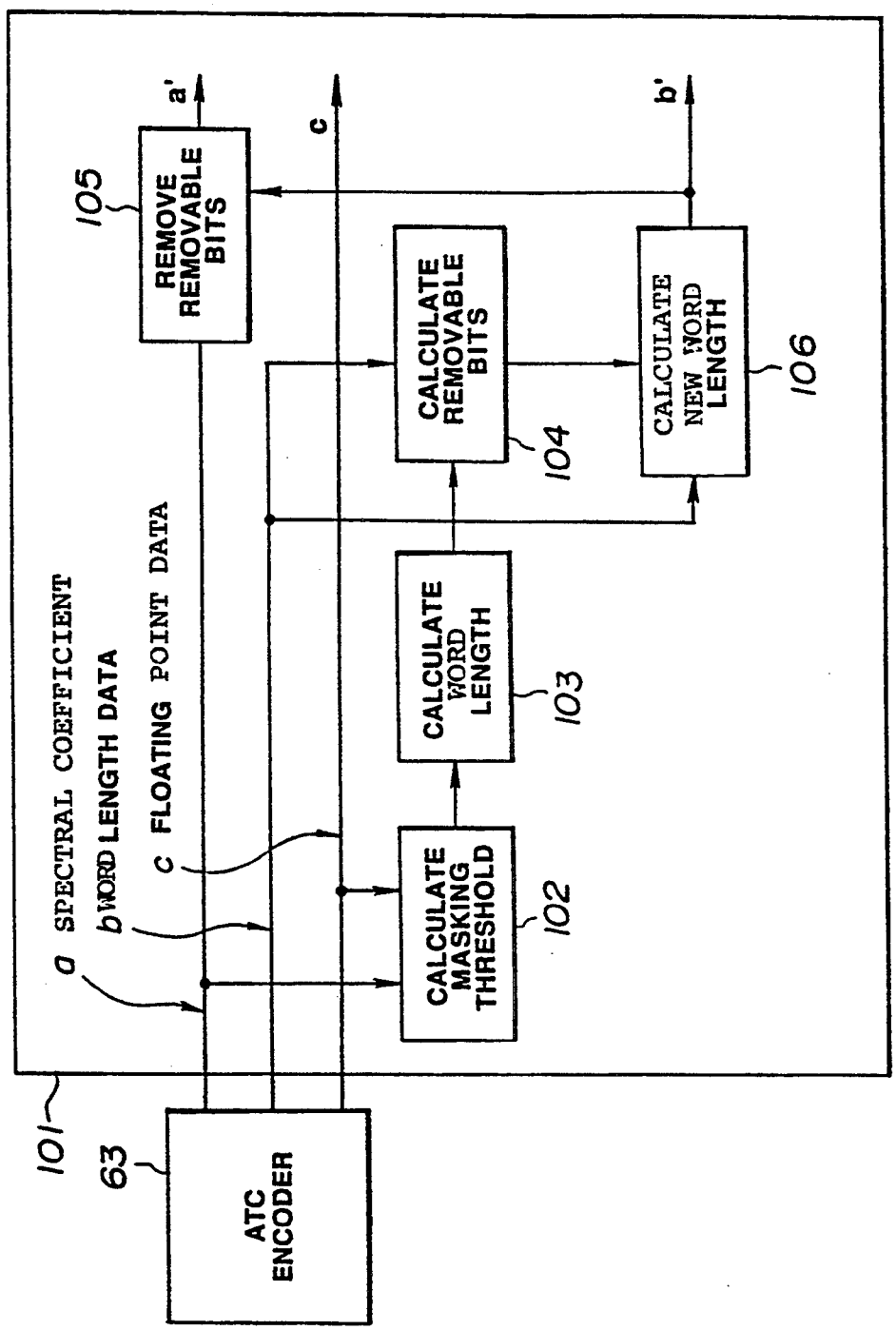
FIG. 10 is a block circuit diagram showing a practical example of an excess bit reduction circuit.

FIG. 10 shows a practical example of a bit removing circuit 101 for removing redundant bits from compressed digital data, equivalent to the excess bit reduction circuit 84. In this figure, the output of the ATC encoder 63, also shown in FIG. 1, includes spectral coefficients a, quantizing word length data b, and floating-point data c. The quantizing word length data b indicates the number of bits quantizing the spectral coefficients a in each critical band, and the floating-point data c indicates the way in the spectral coefficients a are normalized.

The bit removing circuit operates to remove redundant bits from the output of the ATC encoder 63. Redundant bits are bits that are unnecessary to the accurate aural perception of the encoded signal (after the encoded signal has been decoded and reproduced). In particular, redundant bits are bits that give a quantizing noise level below the allowable noise level. Since noise which is below the allowable noise level is inaudible, increasing quantizing noise to the allowable noise level by removing the redundant bits will make no difference to the quantizing noise perceived by the listener.

First, the floating point data c and the spectral coefficients a are used to obtain the amplitude of the spectral coefficients in each critical band. From this information, the masking threshold is calculated by the masking threshold calculating circuit 102, using the technique described in connection with FIG. 6. A quantizing word length is then calculated by the quantizing word length calculating circuit 103 using the technique described with reference to FIG. 6. The removable bit calculating circuit 104 compares the newly-calculated quantizing word length with the quantizing word length data b from the ATC encoder output to determine which bits are redundant.

The true quantizing word length circuit 106 compares the quantization word length information b from the ATC encoder output and the quantization word length calculated by the removable bit calculating circuit 104 to determine the true quantizing word length and controls the removable bit removing circuit 105. The bit removing circuit 105 removes the redundant bits from the spectral coefficients a to provide the bit-reduced spectral coefficients a'. The bit-reduced spectral coefficients, together with the floating-point data c, and the true quantizing word length data b', provided by the true quantizing word length circuit 106, are fed to, e.g., the IC card interface circuit 86.

5. MONITORING THE RECORDING DURING HIGH-SPEED COPYING

Figure 11:
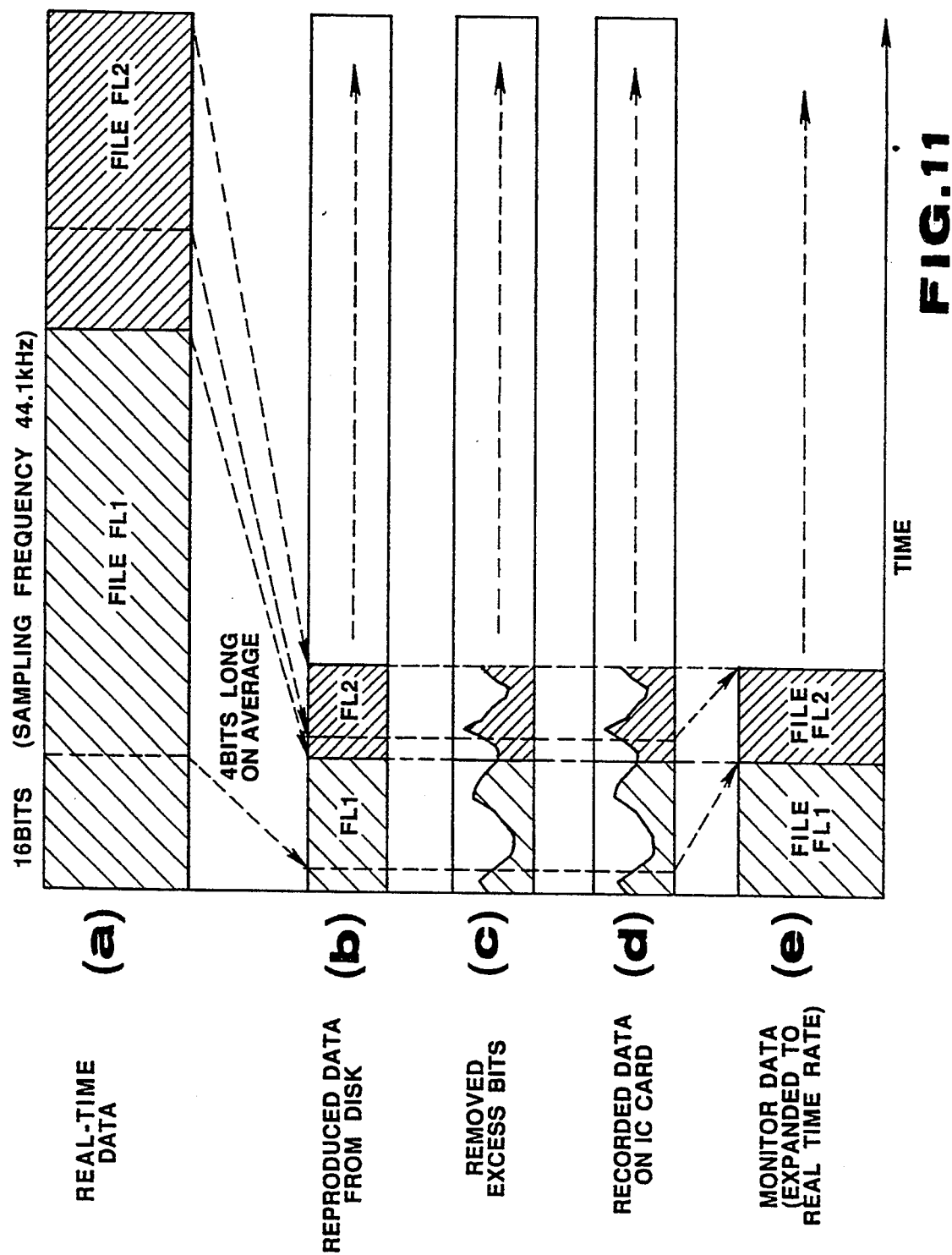
FIG. 11 is a timing chart showing real-time monitoring of the bit-reduced data recorded on the IC card.

Referring to FIG. 11, monitoring during high-speed copying to the IC card 2 will now be explained. Before data compression, the digital data to be recorded on the magneto-optical disc 1 (FIG. 1) is a series of temporally consecutive selections on the real time axis, as shown in FIG. 11(a). The real-time data is compressed by a factor of four to one when recorded on the disc. Digital data reproduced from the disc is time-compressed by a factor of four to one, as shown in FIG. 11(b).

The bit reduction circuit 101 (or the excess bit reduction circuit 84) removes redundant bits that are not required by the human ear for accurate perception of the recorded sound, as described above, and results in variable bit-rate data having a bit rate that is less than one fourth of that of the real time data, as shown in FIG. 11(c). The resulting bit-reduced data is recorded on the IC card 2. The data recorded on the IC card thus has a variable bit rate, as shown in FIG. 11(d).

Bit-reduced data is read out from the IC card 2 at the beginning of each selection, substantially at the same time as it is recorded on the IC card. As shown in FIG. 11(e), the bits removed by the bit reduction circuit 101 are replaced by 0's, and the resulting 16-bit fixed length PCM data fed into the ATC decoder 73 which decodes the data for monitoring.

Monitoring is performed only during the time required to record each selection on the IC card 2. Reading and decoding the selection FL1 from the IC card 2 is discontinued when all of the selection FL1 has been recorded on the IC card 2 (FIG. 11e). Bit-reduced data is next read from the beginning of the next selection FL2 on the IC card 2 at the same time as the next selection FL2 is recorded on the IC card 2. Zeroes (0's) are inserted into the places where bits have been removed by the bit reduction circuit 101 to produce 16-bit fixed length PCM data, which is fed into the ATC decoder 73 for monitoring. The recording of the selection FL2 on the IC card 2 is monitored only while the selection FL2 is being recorded on the IC card 2.

It is to be noted that the present invention is not limited to the above embodiments. For example, the reproducing system for the first recording medium and the reproducing system for the second recording medium need not be part of the same apparatus, but may be separate, interconnected by a data transmitting cable.

The present invention may also be applied to a signal processing apparatus for processing other forms of digitized analog signals such as digital speech signals, or digital video signals, in addition to the abovementioned audio PCM signals. In this case, the synthesis of the minimum audibility curve may be dispensed with, in which case the minimum audibility curve generator 32 and the synthesis circuit 27 are eliminated, and the output of the subtractor 24 is directly connected to the subtractor 28 after deconvolution by the divider 26.

The magneto-optical disc 1 may be driven at a higher recording velocity than the steady-state recording velocity to enable copying to be carried out at a higher rate than that corresponding to the data compression ratio. In this case, high-speed copying may be done at a maximum speed determined by lowest of the maximum recording rate, the maximum reproduction rate, or the maximum signal processing rate. The second recording medium may also be any of a variety of semiconductor memory devices, such as an IC memory cartridge or an IC memory pack.

If the selection being copied is of a longer duration, the recording on the second recording medium may be monitored at a regular time intervals throughout the selection, instead of monitoring only at the beginning of the selection. This may be achieved by skipping playback data at a regular time interval.

I claim:

1. An apparatus for recording, on a recording medium, a recording signal derived from compressed digital data representing an audio information signal, the recording signal, upon reproduction from the recording medium, conversion to an analog signal, and reproduction of the analog signal, being for perception by the human ear, the analog signal including quantization noise, the compressed digital data including plural bits having a bit rate, the bit rate of the bits of the compressed digital data being constant with time, the apparatus comprising:

receiving means for receiving the compressed digital data;

bit removing means for selectively removing redundant bits from portions of the compressed digital data received from the receiving means to provide the recording signal including plural bits having a bit rate, the bit rate of the bits of the recording signal being variable with time, redundant bits being bits selective removal whereof from the compressed digital data leaves unchanged the quantization noise perceived by the human ear in the reproduced analog signal derived from the recording signal by reproduction from the recording medium and conversion; and a recorder for the recording medium, the recorder receiving the recording signal at a variable bit rate from the bit removing means.

2. The apparatus of claim 1, wherein the bit removing means removes bits from the compressed digital data such that the quantization noise has a level lower than an allowable noise level determined by a masking threshold and a minimum audibility limit.

3. The apparatus of claim 1, wherein the recording medium includes a semiconductor memory.

4. The apparatus of claim 3, wherein
the compressed digital data, prior to bit removal, has a data volume, and
the apparatus additionally comprises means for including data indicating the data volume in the recording signal.

5. The apparatus of claim 1, wherein
the compressed digital data, prior to bit removal, has a data volume, and
the apparatus additionally comprises means for including data indicating the data volume in the recording signal.

6. The apparatus of claim 1, additionally comprising means for deriving the compressed digital data from the audio information signal by digitizing the audio information signal, dividing the digitized audio information signal by time into a plurality of frames, orthogonally transforming each frame to provide a plurality of spectral coefficients, and adaptively quantizing the spectral coefficients grouped into critical bands to the provide the compressed digital data.

7. The apparatus of claim 6, wherein:
the apparatus additionally comprises means for applying floating point processing to the spectral coefficients in each critical band and for providing floating point information,
the spectral coefficients in each critical band are quantized using a number of quantizing bits indicated by a word length,
the bit removing means removes redundant bits to reduce the word length of a critical band to a reduced word length, and includes means for providing word length information indicating the reduced word length, and
the apparatus additionally comprises means for including the floating point information and the word length information in the recording signal as subsidiary information.

8. The apparatus of claim 1, wherein
the compressed digital data includes:
spectral coefficients grouped in critical bands, the spectral coefficients in each critical band each being quantized with an equal number of bits, and
quantizing word length information indicating the number of bits used to quantize the spectral components in each critical band, and
the bit removing means comprises:
quantizing word length calculating means for receiving the spectral coefficients and the quantizing word length information and for calculating a new quantizing word length for each critical band;

means, responsive to the new quantizing word length and the quantizing word length information for each critical band, for calculating a redundant bit number for the critical band;

means for removing a number of bits from each spectral coefficient in each critical band according to the redundant bit number to provide bit-removed spectral coefficients; and means for providing the bit-removed spectral coefficients and new quantizing word lengths as the recording signal.

9. The apparatus of claim 8, wherein the quantizing word length calculating means calculates the new quantizing word length on the basis of an allowable noise level determined by a minimum audibility limit and a masking threshold.

10. An apparatus for reproducing compressed digital data representing an audio information signal from a first recording medium, for deriving a recording signal from the reproduced compressed digital data, and for recording the recording signal on a second recording medium, the recording signal recorded on the second recording medium, upon reproduction from the second recording medium, conversion to an analog signal, and reproduction of the analog signal, being for perception by the human ear, the analog signal including quantization noise, the apparatus comprising:

a reproducer for the first recording medium, the reproducer providing the reproduced compressed digital data reproduced from the first recording medium, the reproduced compressed digital data including plural bits having a bit rate, the bit rate of the bits of the compressed digital data being constant with time;

bit removing means for selectively removing redundant bits from portions of the reproduced compressed digital data received from the reproducer to provide the recording signal redundant bits being bits removal whereof from the reproduced compressed digital data leaves unchanged the quantization noise perceived by the human ear in the reproduced analog signal derived from the recording signal by reproduction from the second recording medium and conversion, the recording signal including plural bits having a bit rate, the bit rate of the bits of the recording signal being variable with time; and a recorder for the second recording medium, the recorder receiving the recording signal at a variable bit rate from the bit removing means.

11. The apparatus of claim 10, wherein the bit removing means removes bits from the reproduced compressed digital data such that the quantization noise has a level lower than an allowable noise level determined by a masking threshold and a minimum audibility limit.

12. The apparatus of claim 10, wherein the first recording medium is a disc, and the second recording medium includes a semiconductor memory.

13. The apparatus of claim 12, wherein
the recording signal has a first data volume,
the second recording medium has data indicating the first data volume recorded thereon, and
the reproducer additionally provides the data indicating the first data volume reproduced from the first recording medium.

14. The apparatus of claim 12, wherein the reproduced compressed digital data has a second data volume, and
the recorder additionally receives data indicating the second data volume for recording on the second recording medium.

15. The apparatus of claim 10, wherein
the recording signal has a first data volume,
the second recording medium has data indicating the first data volume recorded thereon, and
the reproducer additionally provides the data indicating the first data volume reproduced from the first recording medium.

16. The apparatus of claim 10, wherein
the reproduced compressed digital data has a second data volume, and
the recorder additionally receives data indicating the second data volume for recording on the second recording medium.

17. The apparatus of claim 10, additionally comprising means for deriving the compressed digital audio data recorded on the first recording medium from the audio information signal by digitizing the audio information signal, dividing the digitized audio information signal by time into a plurality of frames, orthogonally transforming each frame to provide a plurality of spectral coefficients, and adaptively quantizing the spectral coefficients grouped into critical bands to provide the compressed digital data.

18. The apparatus of claim 17 wherein the quantization noise increases as a result of the removal of redundant bits.

19. The apparatus of claim 17, wherein:
the apparatus additionally comprises means for applying floating point processing to the spectral coefficients in each critical band and for providing floating point information,
the spectral coefficients in each critical band are quantized using a number of quantizing bits indicated by a word length,
the bit removing means removes redundant bits to reduce the word length of a critical band to a reduced word length, and includes means for providing word length information indicating the reduced word length, and
the apparatus additionally comprises means for including the floating point information and the word length information in the recording signal as subsidiary information.

20. The apparatus of claim 10, wherein the compressed digital data includes:
spectral coefficients grouped in critical bands, the spectral coefficients in each critical band each being quantized with an equal number of bits; and
quantizing word length information indicating the number of bits used to quantize the spectral components in each critical band, and the bit removing means comprises:

quantizing word length calculating means for receiving the spectral coefficients and the quantizing word length information and for calculating a new quantizing word length for each critical band;

means, responsive to the new quantizing word length and the quantizing word length information for each critical band, for calculating a redundant bit number for the critical band;

means for removing a number of bits from each spectral coefficient in each critical band according to the redundant bit number to provide bit-removed spectral coefficients; and means for providing the bit-removed spectral coefficients and new quantizing word lengths as the recording signal.

21. The apparatus of claim 20, wherein the quantizing word length calculating means calculates the new quantizing word length on the basis of an allowable noise level determined by a minimum audibility limit and a masking threshold.

22. A method for removing bits from compressed digital data to provide an output signal, the compressed digital data representing an audio information signal and including adaptively-quantized spectral coefficients, the compressed digital data including plural bits having a bit rate, the bit rate of the bits of the compressed digital data being constant with time, the output signal, upon conversion to an analog signal and reproduction of the analog signal, being for perception by the human ear, the analog signal including quantization noise, the method comprising the steps of:

receiving the compressed digital data;

determining ones of the spectral coefficients quantized with quantizing bits including redundant bits, redundant bits being quantizing bits removal whereof from the quantized spectral coefficients leaves unchanged the quantizing noise perceived by the human ear in the reproduced analog signal derived from the output signal by conversion and reproduction; and removing the redundant bits from the ones of the quantized spectral coefficients in the compressed digital data determined by the determining step to include redundant bits to provide the output signal.

23. The method of claim 22, wherein the step of removing redundant bits from the ones of the quantized spectral coefficients in the compressed digital data provides the output signal including plural bits having a bit rate, the bit rate of the output signal being variable with time.

24. The method of claim 22, wherein the step of removing redundant bits from the ones of the quantized spectral coefficients in the compressed digital data removes from the compressed digital data quantizing bits that reduce the quantization noise of the reproduced analog signal derived from the output signal to a level below an allowable noise level determined by a masking threshold and a minimum audible limit.

25. The method of claim 24, wherein the step of removing redundant bits from the ones of the quantized spectral coefficients in of the compressed digital data provides the output signal including plural bits having a bit rate, the bit rate of the output signal being variable with time.

26. The method of claim 22, wherein in the step of receiving the compressed digital data:

the spectral coefficients in the compressed digital data are grouped in critical bands, the spectral coefficients in each critical band each being quantized with an equal number of bits;

the compressed digital data additionally includes quantizing word length information indicating the number of bits used to quantize the spectral components in each critical band, and the step of determining ones of the spectral coefficients quantized with quantizing bits including redundant bits comprises the steps of:

receiving the spectral coefficients and the quantizing word length information;

calculating a new quantizing word length for each critical band; and calculating, in response to the new quantizing word length and the quantizing word length information for each critical band, a redundant bit number for the critical band, and the step of removing redundant bits from the ones of the spectral coefficients determined to include redundant bits includes the steps of:

removing a number of bits from each spectral coefficient in each critical band according to the redundant bit number to provide bit-removed spectral coefficients; and providing the bit-removed spectral coefficients and new quantizing word lengths as the output signal.

27. The method of claim 26, wherein, in the step of calculating the new quantizing word length, the new word length is calculated on the basis of an allowable noise level determined by a minimum audibility limit and a masking threshold.

28. The method of claims 22 or 24, additionally comprising the steps of:

providing a recording apparatus adapted for recording on a recording medium, and recording the output signal on the recording medium using the recording apparatus.

29. The method of claim 28, wherein the step of removing the redundant bits from the ones of the spectral coefficients in the compressed digital data increases the quantization noise of the analog signal derived from the output signal as a result of the removal of quantizing bits.

30. The method of claim 28, wherein in the step of receiving the compressed digital data, the compressed digital data received has a data volume, and the step of recording the output signal using the recording apparatus includes the step of recording the data volume on the recording medium using the recording apparatus.

31. The method of claim 28, wherein in the step of receiving the compressed digital data:

the spectral coefficients in the compressed digital data are grouped in critical bands, the spectral coefficients in each critical band each being quantized with an equal number of bits; and the compressed digital data additionally includes quantizing word length information indicating the number of bits used to quantize the spectral components in each critical band, the step of determining ones of the spectral coefficients quantized with quantizing bits including redundant bits comprises the steps of:

receiving the spectral coefficients and the quantizing word length information;

calculating a new quantizing word length for each critical band;

calculating, in response to the new quantizing word length and the quantizing word length information for each critical band, a redundant bit number for the critical band, and the step of removing redundant bits from the ones of the spectral coefficients determined to include redundant bits includes the steps of:

removing a number of bits from each spectral coefficient in each critical band according to the redundant bit number to provide
bit-removed spectral coefficients; and
providing the bit-removed spectral coefficients and new
quantizing word lengths as the output signal.

32. The method of claim 31, wherein, in the step of calculating the new quantizing word length, the new word length is calculated on the basis of an allowable noise level determined by a minimum audibility limit and a masking threshold.

33. The method of claims 22 or 24, wherein the step of receiving the compressed digital data includes:
providing an apparatus adapted for reproducing compressed digital data from a first recording medium, and for recording the output signal on a second recording medium,
reproducing compressed digital data from the first recording medium using the apparatus, and
the method additionally includes the step of recording the output signal to the second recording medium.

34. The method of claim 33, wherein, the step of providing the apparatus for reproducing compressed digital data from a first recording medium and for recording the output signal on a second recording medium, an apparatus recording the output signal in a semiconductor memory as the second recording medium is provided.

35. The method of claim 34, wherein
in the step of recording the output signal on the second recording medium, the output signal recorded on the second recording medium has a first data volume, and
the method additionally includes the step of recording the first data volume on the first recording medium.

36. The method of claim 33, wherein, in the step of providing the apparatus for reproducing compressed digital data from a first recording medium and for recording the output signal on a second recording medium, an apparatus reproducing compressed digital data from a disc and recording the output signal in a semiconductor memory as the second recording medium is provided.

37. The method of claim 36, wherein
in the step of reproducing compressed digital data from the first recording medium, the compressed digital data reproduced has a second data volume, and
the step of recording the output signal on the second recording medium includes the step of recording the second data volume on the second recording medium.

38. The method of claim 33, wherein the step of removing redundant bits from the ones of the spectral coefficients in the compressed digital data increases the quantization noise of the analog signal derived from the output signal as a result of the removal of bits.

39. The method of claim 33, wherein
in the step of reproducing compressed digital data from the first recording medium, the compressed digital data reproduced has a second data volume, and
the step of recording the output signal on the second recording medium includes the step of recording the second data volume on the second recording medium.

40. The method of claim 33, wherein in the step of receiving the compressed digital data:
the spectral coefficients of the compressed digital data are grouped in critical bands, the spectral coefficients in each critical band each being quantized with an equal number of bits; and
the compressed digital data additionally includes quantizing word length information indicating the number of bits used to quantize the spectral components in each critical band, the step of determining ones of the spectral coefficients quantized with quantizing bits including redundant bits comprises the steps of:
receiving the spectral coefficients and the quantizing word length information;
calculating a new quantizing word length for each critical band; and
calculating, in response to the new quantizing word length and the quantizing word length information for each critical band, a redundant bit number for the critical band, and the step of removing redundant bits from the ones of the spectral coefficients determined to include redundant bits includes the steps of:
removing a number of bits from each spectral coefficient in each critical band according to the redundant bit number to provide bit-removed spectral coefficients; and
providing the bit-removed spectral coefficients and new quantizing word lengths as the output signal.

41. The method of claim 40, wherein, in the step of calculating the new quantizing word length, the new word length is calculated on the basis of an allowable noise level determined by a minimum audibility limit and a masking threshold.

42. The method of claims 22 or 24, wherein:
the method additionally comprises the step of applying floating point processing to the spectral coefficients in each critical band and providing floating point information;
in the step of receiving the compressed digital data, the spectral coefficients in the compressed digital data are divided into critical bands, and the spectral coefficients in each critical band are adaptively quantized using a number of quantizing bits indicated by a word length;
the step of removing redundant bits removes redundant bits to reduce the word length of a critical band to a reduced word length, and includes the step of providing word length information indicating the reduced word length; and
the method additionally comprises the step of including the floating point information and the word length information in the output signal.

* * * * *